United States Patent
Hayashi et al.

(10) Patent No.: US 12,379,325 B2
(45) Date of Patent: Aug. 5, 2025

(54) EXTERNAL APPEARANCE INSPECTION APPARATUS AND EXTERNAL APPEARANCE INSPECTION METHOD

(71) Applicant: OMRON Corporation, Kyoto (JP)

(72) Inventors: Shingo Hayashi, Kyoto (JP); Daisuke Konishi, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 266 days.

(21) Appl. No.: 17/765,362

(22) PCT Filed: Mar. 11, 2020

(86) PCT No.: PCT/JP2020/010532
§ 371 (c)(1),
(2) Date: Mar. 30, 2022

(87) PCT Pub. No.: WO2021/079543
PCT Pub. Date: Apr. 29, 2021

(65) Prior Publication Data
US 2022/0381700 A1  Dec. 1, 2022

(30) Foreign Application Priority Data
Oct. 23, 2019  (JP) .................... 2019-192452

(51) Int. Cl.
*G01N 21/89* (2006.01)
*G01B 11/04* (2006.01)
*G01N 21/956* (2006.01)

(52) U.S. Cl.
CPC ....... *G01N 21/8901* (2013.01); *G01B 11/043* (2013.01); *G01N 2021/95638* (2013.01)

(58) Field of Classification Search
CPC ..... G01N 21/8901; G01N 2021/95638; G01B 11/043
(Continued)

(56) References Cited

U.S. PATENT DOCUMENTS 5,134,665 A * 7/1992 Jyoko ............... G01B 11/0608
                                                       382/150
5,293,324 A * 3/1994 Tokura ............ G01N 21/95684
                                                       382/141
(Continued)

FOREIGN PATENT DOCUMENTS

JP     H0814848 A    1/1996
JP     2006030094 A  2/2006
(Continued)

OTHER PUBLICATIONS

International Search Report issued in Intl. Appln. No. PCT/JP2020/010532 mailed May 26, 2020. English translation provided.
(Continued)

*Primary Examiner* — Sang H Nguyen
(74) *Attorney, Agent, or Firm* — ROSSI, KIMMS & McDOWELL LLP

(57) ABSTRACT

An object is to shorten time required for visual inspection. A visual inspection device (1) configured to inspect an appearance of an inspection object (30), the visual inspection device (1) including: an imager (3) configured to image the inspection object (30) arranged at a predetermined position of the visual inspection device (1); and a height measurer (11, 12) configured to measure a height of the inspection object (30) carried into the visual inspection device (1) or carried out from the visual inspection device (1).

6 Claims, 5 Drawing Sheets

(58) Field of Classification Search
USPC .......................................................... 356/601
See application file for complete search history.

(56) References Cited

U.S. PATENT DOCUMENTS

| | | | | |
|---|---|---|---|---|
| 5,463,227 A | * | 10/1995 | Stern ..................... | H01L 21/681 250/559.4 |
| 5,598,345 A | * | 1/1997 | Tokura ............. | G01N 21/95684 382/156 |
| 5,686,994 A | * | 11/1997 | Tokura ............... | H05K 13/0815 348/126 |
| 2004/0101190 A1 | * | 5/2004 | Maida ................... | G01R 31/71 382/150 |
| 2005/0025353 A1 | * | 2/2005 | Kaneko ............ | H01L 21/67259 382/152 |
| 2005/0162644 A1 | * | 7/2005 | Watanabe ............. | G01N 21/00 356/237.1 |
| 2009/0123060 A1 | * | 5/2009 | Liu .................. | G01N 21/95684 382/149 |
| 2011/0222655 A1 | * | 9/2011 | Murakami ............ | G01N 23/18 378/54 |
| 2013/0195244 A1 | | 8/2013 | Hosokawa | |
| 2013/0259359 A1 | * | 10/2013 | Hong ..................... | G06T 7/0006 382/150 |
| 2014/0043033 A1 | * | 2/2014 | Butters .............. | G01R 31/2656 324/501 |
| 2014/0160492 A1 | * | 6/2014 | Lam ....................... | G01B 11/14 356/614 |
| 2015/0045927 A1 | * | 2/2015 | Haugen .................... | H05K 3/00 700/109 |
| 2015/0253129 A1 | * | 9/2015 | Ohnishi ................. | G01B 11/24 348/87 |

FOREIGN PATENT DOCUMENTS

| | | |
|---|---|---|
| JP | 2012190890 A | 10/2012 |
| JP | 2013156172 A | 8/2013 |
| JP | 2017166865 A | 9/2017 |

OTHER PUBLICATIONS

Written Opinion issued in Intl. Appln. No. PCT/JP2020/010532 mailed May 26, 2020. English translation provided.
Office Action issued in Korean Appln. No. 10-2022-7010272, mailed Apr. 29, 2024. English translation provided.

* cited by examiner

EXTERNAL APPEARANCE INSPECTION APPARATUS AND EXTERNAL APPEARANCE INSPECTION METHOD

TECHNICAL FIELD

The present invention relates to a technique for performing visual inspection of an inspection object.

BACKGROUND ART

Conventionally, there has been known a visual inspection device that detects defects such as a scratch, a dent, or a color abnormality of an inspection object on the basis of an image of the inspection object (including determination of presence or absence of defect and discrimination of type of defect).

In such a visual inspection device, in a case where the inspection object is imaged and the height of the inspection object is measured using a laser displacement meter or the like, various configurations are conceivable for the relationship between an imaging means and a height measurement means. In general, the imaging means is immobilized with respect to the inspection object to perform imaging while the relative positional relationship between the imaging means and the inspection object is changed by moving either the imaging means or the inspection object. On the other hand, the height measurement means performs measurement while moving the inspection object with respect to the height measurement means in order to acquire three-dimensional information of the inspection object. When such an imaging means and a height measurement means are integrally provided, imaging and height measurement cannot be performed concurrently. Therefore, it is necessary to sequentially perform imaging and height measurement.

Therefore, there has been a problem that the time required for visual inspection becomes long.

PRIOR ART DOCUMENT

Patent Document

Patent Document 1: Japanese Unexamined Patent Publication No. 2006-30094

SUMMARY OF THE INVENTION

Problems to be Solved by the Invention

The present invention has been made in view of the above problems, and an object of the present invention is to provide a technique capable of shortening the time required for visual inspection in a visual inspection device.

Means for Solving the Problem

The present invention for solving the above problem is a visual inspection device configured to inspect an appearance of an inspection object, the visual inspection device including:
an imager configured to image the inspection object arranged at a predetermined position of the visual inspection device; and a height measurer configured to measure a height of the inspection object carried into the visual inspection device or carried out from the visual inspection device.

According to the present invention, the height measurer can measure the height of an inspection object carried into the visual inspection device or an inspection object carried out from the visual inspection device. That is, the time required for the height measurer to measure the height of the inspection object is not required in addition to the time required for the imager to image the inspection object between carrying in the inspection object to the visual inspection device and carrying out of the inspection object from the visual inspection device. By the height measurer performing height measurement concurrently with carrying in or carrying out of the inspection object to or from the visual inspection device, the time required for the height measurement can be absorbed into the time for the carrying in or carrying out of the inspection object, and therefore the time required for the visual inspection can be shortened.

In the present invention,
the height measurer may be provided at a position where an inspected part of the inspection object passes through a measurement target region of the height measurer when the inspection object is carried into the visual inspection device.

According to this, when the inspection object is carried into the visual inspection device, the inspected part of the inspection object passes through the measurement target region of the height measurer, and therefore the height measurer can measure the height of the inspected part of the inspection object carried into the visual inspection device.

In the present invention,
the height measurer may be provided at a position where an inspected part of the inspection object passes through a measurement target region of the height measurer when the inspection object is carried out from the visual inspection device.

According to this, when the inspection object is carried out from the visual inspection device, the inspected part of the inspection object passes through the measurement target region of the height measurer, and therefore the height measurer can measure the height of the inspected part of the inspection object carried out from the visual inspection device.

In the present invention,
the inspection object is a circuit board, and the height measurer may measure a height of solder with respect to a lead of a circuit component mounted on the circuit board.

According to this, since the height of solder with respect to a lead of a circuit component mounted on a circuit board can be measured in visual inspection of the circuit board, it is possible to shorten the time required for the visual inspection of the circuit board including inspection of the presence or absence of a soldering defect in which the solder protrudes beyond a leading end of the lead.

The present invention is
a visual inspection method in a visual inspection device configured to inspect an appearance of an inspection object, the visual inspection method including:
a carrying in step of carrying in the inspection object to the visual inspection device;
a step of imaging the carried in inspection object;
a carrying out step of carrying out the inspection object from the visual inspection device; and
a step of measuring a height of the inspection object concurrently with the carrying in step or the carrying out step.

According to the present invention, the time required to measure the height of the inspection object is not required in addition to the time required to image the inspection object between carrying in the inspection object to the visual inspection device and carrying out of the inspection object from the visual inspection device. By performing height measurement concurrently with carrying in or carrying out of the inspection object to or from the visual inspection device, the time required for the height measurement can be absorbed into the time for the carrying in or carrying out of the inspection object, and therefore the time required for the visual inspection can be shortened.

Effect of the Invention

According to the present invention, it is possible to shorten time required for visual inspection in the visual inspection device.

MODE FOR CARRYING OUT THE INVENTION

Application Example

Figure 1:
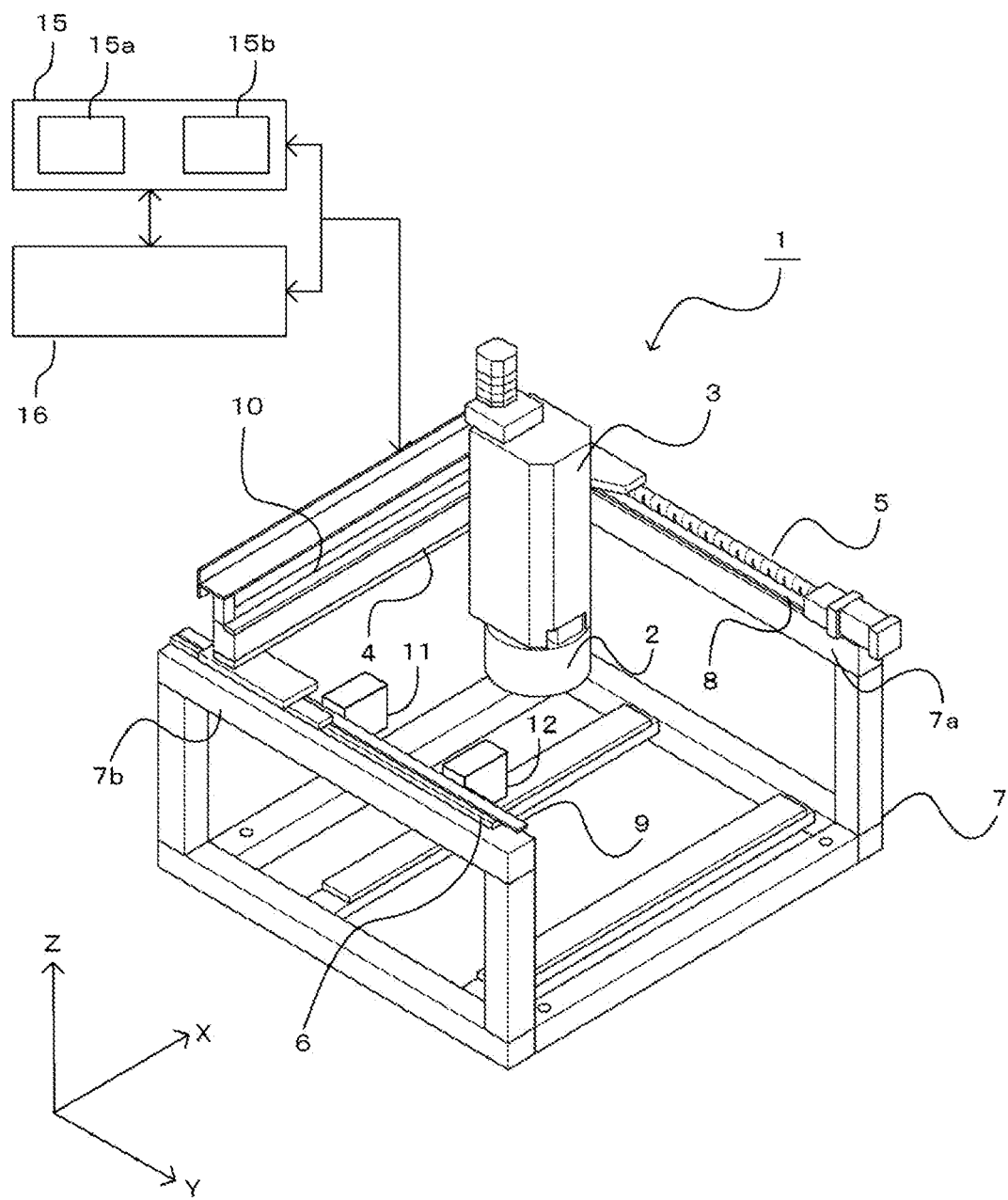
FIG. 1 is a perspective view illustrating a schematic configuration of a visual inspection device in an example of the present invention.

Application examples of the present invention will be described below with reference to the drawings. FIG. 1 is a view illustrating a schematic configuration of a main part of a visual inspection device 1 according to an application example of the present invention. The visual inspection device 1 is provided with an imaging unit 3 including a camera 2 that images a circuit board (hereinafter, simply referred to as "board") 30, and sensors 11 and 12 of a laser displacement meter (hereinafter, simply referred to as "laser displacement meter") that measure a solder height with respect to a lead of a circuit component mounted on the board 30.

The board 30 is arranged on a stage provided on a conveyor moving along an X axis, and is carried in from an outside of the visual inspection device 1 together with the stage by the movement of the conveyor. When carried into the visual inspection device 1, the board 30 passes through under the laser displacement meters 11 and 12 arranged to irradiate downward with laser light. The laser displacement meters 11 and 12 are provided at positions where the emitted laser light irradiates the region where solder is formed on the lead of the circuit component mounted on the board 30. The laser displacement meters 11 and 12 irradiate the region where the solder is formed on the lead of the circuit component mounted on the board 30, and receive reflected laser light. Then, by processing a signal based on the received laser light, the laser displacement meters 11 and 12 measure the height of the solder formed on the lead of the circuit component mounted on the board 30, and detect whether or not there is a solder protrusion defect where the solder protrudes beyond a leading end portion of the lead.

The camera 2 images the board 30 in a state where the imaging unit 3 moves to a predetermined imaging position in the X axis and/or Y axis direction and stops at the imaging position with respect to the board 30 clamped at a predetermined position in the visual inspection device 1. Then, the image is processed to inspect the presence or absence of various defects.

When the inspection using the camera 2 is completed, the clamping is released, and the board 30 arranged on the stage is carried out to the outside of the visual inspection device 1 along with the movement of the conveyor.

Figure 3:
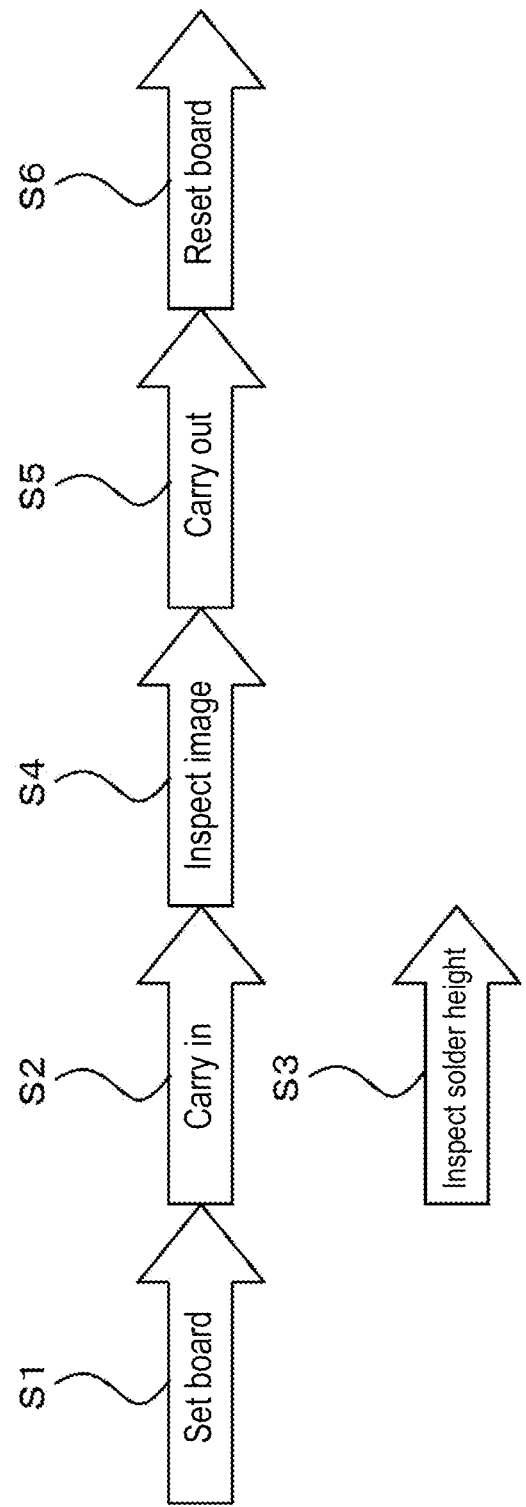
FIG. 3 is a time chart showing a procedure of visual inspection in the example of the present invention.

As illustrated in FIG. 3, in the visual inspection device 1 according to the present application example, height measurement (step S3) with respect to the lead of the circuit component mounted on the board 30 is performed concurrently with carrying in (step S2) of the board 30 to the visual inspection device 1. Then, after the board 30 is carried into the visual inspection device 1, it is sufficient to perform only an imaging operation (step S4) by the camera 2.

Figure 4:
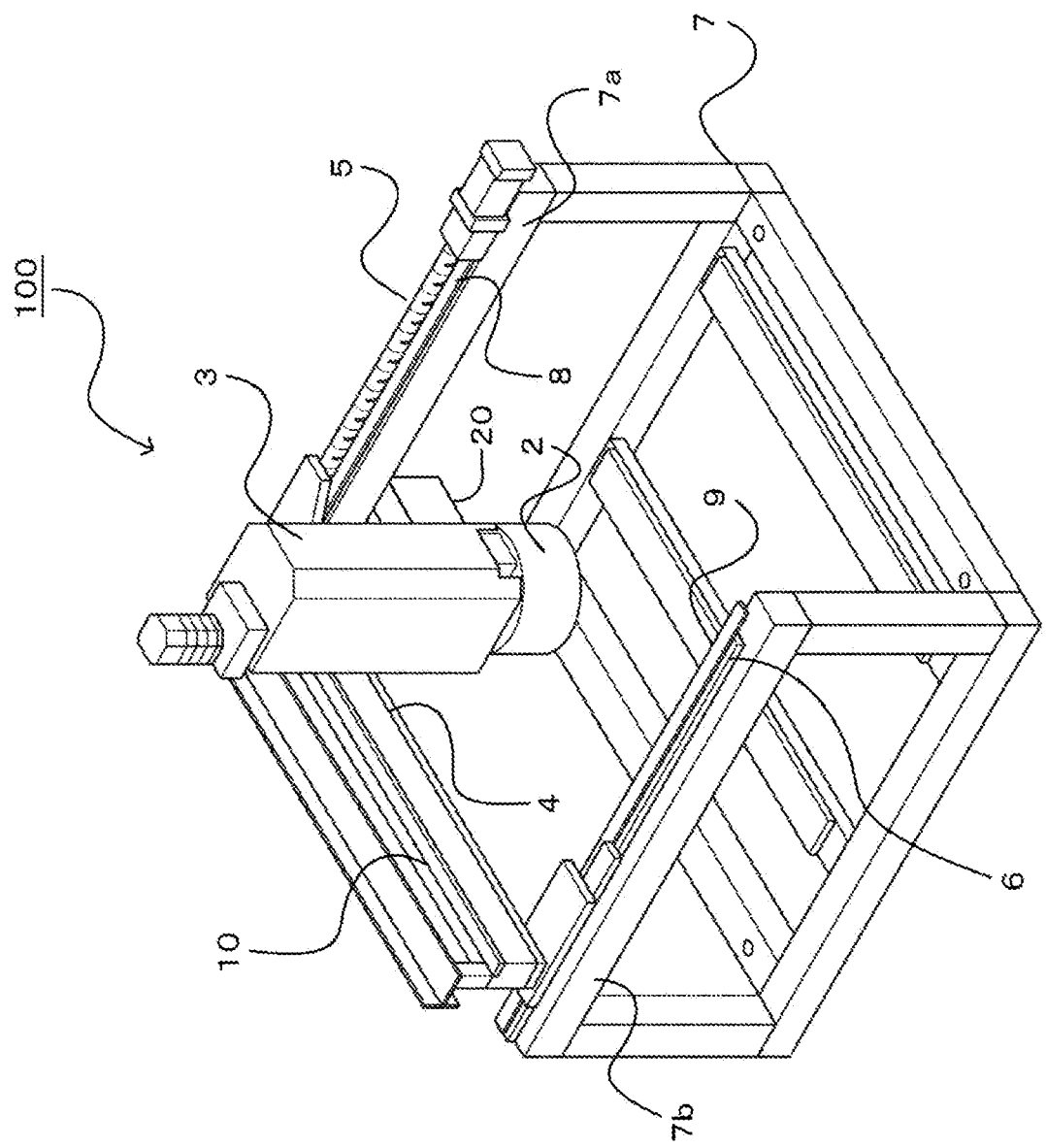
FIG. 4 is a perspective view illustrating a schematic configuration of a visual inspection device in a comparative example of the present invention.
Figure 5:
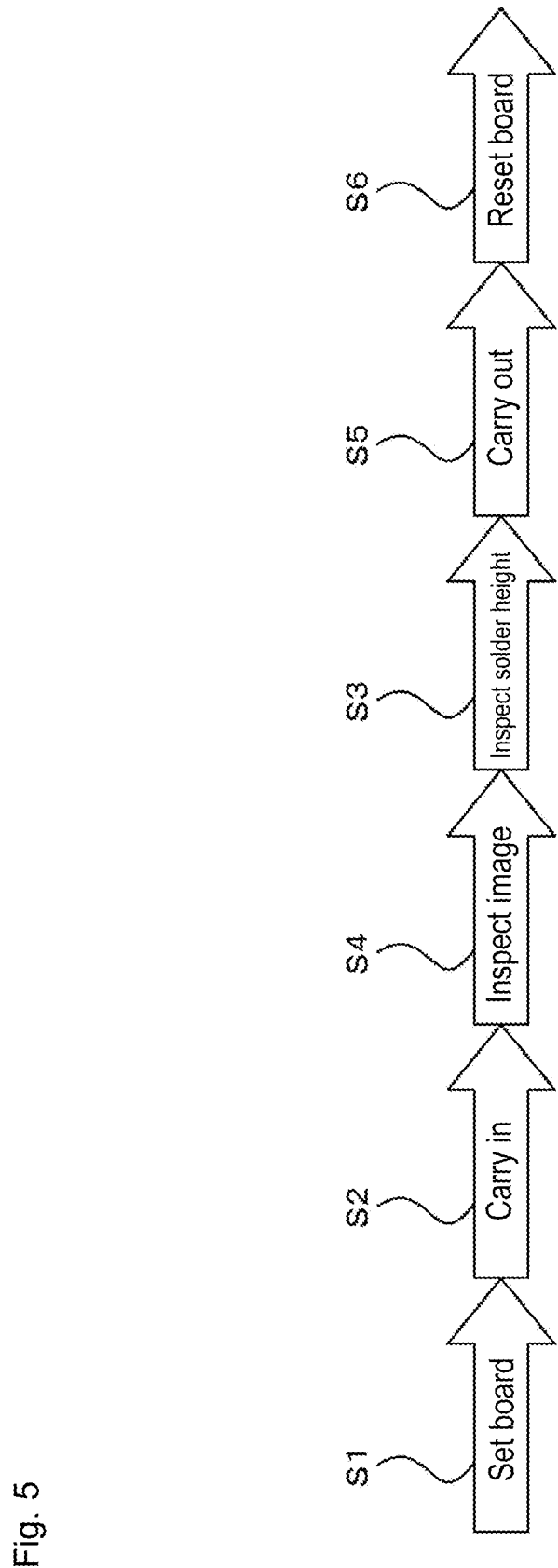
FIG. 5 is a time chart showing a procedure of visual inspection in the comparative example of the present invention.

When the imaging unit 3 and a laser displacement meter 20 are integrally configured as in a visual inspection device 100 illustrated in FIG. 4, it is necessary to sequentially perform, as illustrated in FIG. 5, an operation of moving to a predetermined imaging position with respect to the board 30 carried into the visual inspection device 100 and imaging in a state of being stopped at the predetermined imaging position (step S4), and an operation of moving while irradiating, with laser light, the region where the solder is formed on the lead of the circuit component (step S3). That is, since the time of the solder height measurement operation by the laser displacement meter 20 is required in addition to the time of the imaging operation by the camera 2, the time required for the visual inspection of one board 30 becomes long.

On the other hand, in the visual inspection device 1 according to the application example of the present invention, since the solder height measurement operation by the laser displacement meters 11 and 12 is performed concurrently with the carrying in operation of the board 30, the time required for the visual inspection of one board 30 can be shortened as compared with the visual inspection device 100 described above.

Example 1

Hereinafter, a visual inspection device according to an example of the present invention will be described in more detail with reference to the drawings. However, the dimensions, materials, shapes, relative arrangements, and the like of the components described in this embodiment should be appropriately changed according to the configuration of the device to which the invention is applied and various conditions. That is, the scope of this invention is not intended to be limited to the following embodiment.

<Device Configuration>

Hereinafter, the visual inspection device 1 according to the example of the present invention will be described in more detail with reference to the drawings.

FIG. 1 is a perspective view illustrating a schematic configuration of a main part in which a casing of the visual inspection device 1 is omitted. The visual inspection device 1 mainly includes the imaging unit 3 including the camera 2 that images an inspection object, a mount 4 that includes a ball screw not illustrated and supports the imaging unit 3 movably in the X axis direction, a ball screw 5 that drives the mount 4 in the Y axis direction, a guide 6 that guides, in the Y axis direction, the mount 4 driven by the ball screw 5, the sensors 11 and 12 of the laser displacement meter, and a frame 7 that supports them. A ball screw support 7a extending in the Y axis direction of the frame 7 is provided with a linear scale 8 that detects the position of the mount 4 in parallel to the ball screw 5. Then, a guide support 7b extending similarly in the Y axis direction of the frame 7 is provided with a linear scale 9 that detects the position of the mount 4 in parallel to a rail that guides a slider provided on the mount 4. The two laser displacement meters 11 and 12 are arranged along the Y axis direction in the device inside of the guide support 7b. A linear scale 10 that detects the position of the imaging unit 3 is provided along the mount 4 extending in the X axis direction. Here, the imaging unit 3 corresponds to the imager of the present invention, and the laser displacement meters 11 and 12 correspond to the height measurer of the present invention.

In the visual inspection device 1 of FIG. 1, the imaging unit 3 is provided with the camera 2 having a downward visual field. A conveyor that conveys the board 30, which is the inspection object, in the X axis direction is arranged below the camera 2. The board 30 arranged on the stage carried in from the outside of the visual inspection device 1 by the conveyor is clamped and stopped at a predetermined position below the camera 2. Image inspection is performed by moving the imaging unit 3 in the X axis direction and/or the Y axis direction as necessary to image a predetermined region of the board 30. For example, the presence or absence of a component positional deviation, an angle (rotation) deviation, a missing part (component is not arranged), a wrong component (wrong component is arranged), a wrong polarity (polarity between the component side and the board side is different), front and back reversal (component is arranged face-down), a component height, an electrode deviation, an electrode floating, and the like is inspected in the image inspection. When the inspection is finished, the stage on which the board 30 is arranged is conveyed by the conveyor from below the camera 2 to the outside of the visual inspection device 1.

In the visual inspection device 1 of FIG. 1, the laser displacement meters 11 and 12 are arranged along the Y axis direction on the upstream side of the imaging unit 3 in the direction of conveying the board 30 and in the device inside (the back side in the figure) of the guide support 7b above the conveyor. The laser displacement meters 11 and 12 three-dimensionally measure a solder fillet formed on the lead of the circuit component mounted on the board 30, and determine whether or not the height of the solder is a normal value (allowable range) from the measurement result. At this time, the laser displacement meters 11 and 12 are provided at positions where the emitted laser light irradiates a portion (inspected part) where the solder fillet is formed on the lead of the circuit component mounted on the board 30. That is, a lead 30a and a solder 30b, which are inspected parts, pass through an irradiation region (measurement target region) of the laser light from the laser displacement meters 11 and 12. The laser displacement meters 11 and 12 irradiate the region where the solder fillet is formed on the lead of the circuit component mounted on the board 30, and receive reflected laser light. Then, by processing a signal based on the received laser light, the laser displacement meters 11 and 12 measure the height of the solder formed on the lead of the circuit component mounted on the board 30.

Note that the visual inspection device 1 includes a control device 15 and a servo driver 16 that controls the ball screw 5 and the like of the visual inspection device 1 according to a command of the control device 15. An image by the imaging unit 3 and information on the height detected by the laser displacement meters 11 and 12 are transmitted to the control device 15, and a calculator 15b included in the control device 15 determines whether or not the solder height is good or bad according to a program stored in a storage 15a provided in the control device 15.

Figure 2B:
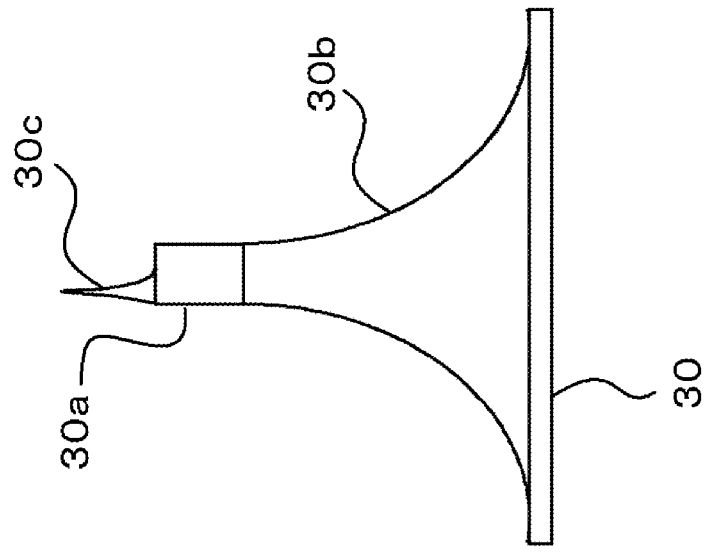
FIGS. 2A and 2B are views explaining solder height inspection in the visual inspection device according to the example of the present invention.
Figure 2A:
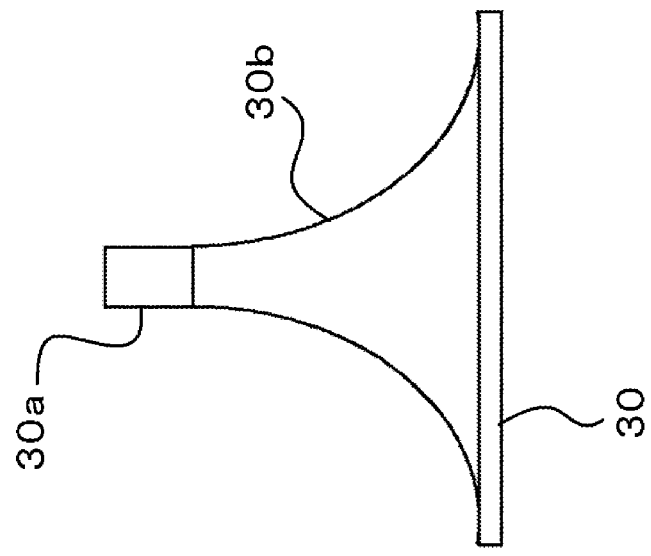

FIGS. 2A and 2B are views explaining solder height inspection performed by the laser displacement meters 11 and 12. When the solder is formed normally, a solder fillet 30b is formed on the board 30 so that a leading end 30a of the lead of the circuit component mounted on a lower surface of the board 30 is exposed, as illustrated in FIG. 2A. Therefore, as the height of the solder, the height of the leading end 30a of the lead is measured, and those having the height of the leading end of the lead out of the tolerance range are determined to be abnormal. FIG. 2B illustrates an example of a case where the solder height is determined to be abnormal. Here, solder is attached to the leading end 30a of the lead, and a protrusion 30c beyond the height of the leading end 30a of the lead is formed. By such solder height determination, it is possible to inspect the presence or absence of a defect (solder protrusion defect) in which the solder 30c protrudes beyond the leading end 30a of the lead.

In the example, the laser displacement meters 11 and 12 are arranged along the Y axis direction in the device inside of the guide support 7b, which is the position on the carrying in side of the board 30 of the visual inspection device 1, and the solder height inspection including the solder height measurement is performed in the process of carrying in the board 30 to the visual inspection device 1, that is, in the middle of moving the board 30 to a predetermined position for performing the image inspection by the imaging unit 3.

A flow of the visual inspection method in the visual inspection device 1 is illustrated in FIG. 3 (the arrow indicates the direction in which time advances). First, the board 30, which is an inspection target, is arranged on the stage (step S1). Next, the conveyor carries in the stage together with the board 30 toward a predetermined position of the visual inspection device 1 (step S2). Then, concurrently with the carrying in of the board 30 to the visual inspection device 1, the laser displacement meters 11 and 12 perform solder height inspection including solder height measurement (step S3). When the stage on which the board 30 is arranged is clamped at a predetermined position of the visual inspection device 1, the imaging unit 3 performs image inspection (step S4). When the image inspection is finished, the stage on which the board 30 is arranged is carried out from the visual inspection device 1 by the conveyor (step S5). When the stage on which the board 30 is arranged is moved to a predetermined position outside the visual inspection device 1, the board 30 is removed from the stage (step S6). Here, steps S2 and S5 correspond to the carrying in step and the carrying out step of the present invention, respectively.

Thus, the solder height inspection (step S3) can be performed concurrently with the carrying in (step S2) of the stage on which the board 30 is arranged to the predetermined position of the visual inspection device 1. The time required for the visual inspection of one board 30 can be shortened as compared with a case of continuously performing the image inspection (step S4) including the imaging by the imaging unit 3 and the solder height inspection (step S3) including the solder height measurement by the laser displacement meter after carrying in the stage to the predetermined position of the visual inspection device 1.

In the above-described example, two laser displacement meters are provided, but the number of laser displacement meters is not limited to this. One laser displacement meter may be arranged above the region through which the lead 30a and the solder 30b of the board 30 pass. Three or more laser displacement meters may be provided such that a laser displacement meter at a corresponding position is used according to the region through which the lead 30a and the solder 30b of the board 30 pass. The laser displacement meter is not limited to be fixed to the guide support 7b, and may be moved according to the region through which the lead 30a and the solder 30b of the board 30 pass.

In the above-described example, the laser displacement meter measures the solder height. However, a phase shift method, a spatial coding method, a light cutting method, or the like may be used for measurement of solder height, and the method of measurement of solder height is not limited.

In the above-described example, the laser displacement meters 11 and 12 measure the solder height of the board 30 carried into the predetermined position of the visual inspection device 1. However, the laser displacement meters 11 and 12 may measure the solder height of the board 30 carried out from the predetermined position of the visual inspection device 1 after completion of the image inspection. In this case, in the time chart of FIG. 3, the solder height inspection in step S3 is performed concurrently with the carrying out of the board in step S5.

The above-described example has been described as an example in which, in the visual inspection device 1, the conveyor that conveys the board 30 moves in the X axis direction, and the board 30 is carried in along a positive direction of the X axis and is carried out similarly along the positive direction of the X axis. However, the present invention can be similarly applied to a case where the board 30 is carried in along the positive direction of the X axis and is carried out along a negative direction of the X axis. Also in this case, the laser displacement meters 11 and 12 may be provided at the positions illustrated in FIG. 1, and the solder height inspection may be performed when the board 30 is carried in or carried out.

Note that in the following, the constituent elements of the present invention will be described with symbols in the drawings in order to enable comparison between the constituent elements of the present invention and the configurations of the example.

<Invention 1>

A visual inspection device (1) configured to inspect an appearance of an inspection object (30), the visual inspection device (1) including:

an imager (3) configured to image the inspection object (30) arranged at a predetermined position of the visual inspection device (1); and a height measurer (11, 12) configured to measure a height of the inspection object (30) carried into the visual inspection device (1) or carried out from the visual inspection device (1).

DESCRIPTION OF SYMBOLS 1 visual inspection device
3 imaging unit
11, 12 laser displacement meter
30 board
30a lead
30b solder fillet
30c solder protrusion defect

The invention claimed is:

1. A visual inspection device configured to inspect an appearance of an inspection object, the inspection object being a circuit board, the visual inspection device comprising:
   an imager configured to move to a predetermined imaging position, stop at the predetermined imaging position, and image, at the predetermined imaging position, the inspection object arranged at a predetermined position of the visual inspection device; and
   a height measurer configured to measure a height of solder with respect to a lead of the inspection object passing through a measurement target region when the inspection object is carried into the visual inspection device or carried out from the visual inspection device and while the inspection object is being moved with respect to the height measurer.

2. The visual inspection device according to claim 1, wherein the height measurer is provided at a position where an inspected part of the inspection object passes through a measurement target region of the height measurer when the inspection object is carried into the visual inspection device.

3. The visual inspection device according to claim 1, wherein the height measurer is provided at a position where an inspected part of the inspection object passes through a measurement target region of the height measurer when the inspection object is carried out from the visual inspection device.

4. The visual inspection device according to claim 1, further comprising:
   a calculator configured to determine whether or not the solder height is normal or abnormal based on the height of solder with respect to the lead of the inspection object measured by the height measurer.

5. A visual inspection method in a visual inspection device configured to inspect an appearance of an inspection object by using an imager configured to image the inspection object, the inspection object being a circuit board, the visual inspection method comprising:
   a carrying-in step of carrying in the inspection object to the visual inspection device;
   a step of moving the imager to a predetermined imaging position;
   a step of stopping the imager at the predetermined imaging position;
   a step of imaging, by the imager at the predetermined imaging position, the carried in inspection object;
   a carrying-out step of carrying out the inspection object from the visual inspection device; and
   a step of measuring a height of solder with respect to a lead of the inspection object passing through a measurement target region concurrently with the carrying-in step or the carrying-out step and while the inspection object is being moved.

6. The visual inspection method according to claim 5, further comprising:
   a step of determining whether or not the solder height is normal or abnormal based on the measured height of solder with respect to the lead of the inspection object.

* * * * *